(12) United States Patent
Liao

(10) Patent No.: US 7,972,033 B2
(45) Date of Patent: Jul. 5, 2011

(54) INDICATOR LIGHT

(75) Inventor: Chuan-Wei Liao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 293 days.

(21) Appl. No.: 12/334,641

(22) Filed: Dec. 15, 2008

(65) Prior Publication Data

US 2009/0262537 A1    Oct. 22, 2009

(30) Foreign Application Priority Data

Apr. 22, 2008  (CN) .......................... 2008 1 0301239

(51) Int. Cl.
*F21V 8/00* (2006.01)
(52) U.S. Cl. .................. 362/257; 362/551; 362/311.14; 362/311.15; 362/540
(58) Field of Classification Search .............. 362/257, 362/551, 555, 311.06, 311.14, 311.15, 334, 362/340, 540, 541, 542, 522; 116/202, 257, 263, 286; 340/962, 815.5, 815.75, 815.54, 815.57, 815.76

See application file for complete search history.

(56) References Cited

U.S. PATENT DOCUMENTS

| 1,656,646 A | * | 1/1928 | Parsons ....................... 340/815.5 |
| 2,144,138 A | * | 1/1939 | Batcheller ................. 340/815.48 |
| 4,163,883 A | * | 8/1979 | Boulanger ..................... 200/314 |
| 2006/0002114 A1 | * | 1/2006 | Sun ................................ 362/257 |

FOREIGN PATENT DOCUMENTS

JP    H11-355403 A    12/1999

* cited by examiner

*Primary Examiner* — Sharon E Payne
(74) *Attorney, Agent, or Firm* — Steven M. Reiss

(57) ABSTRACT

An indicator light (10) is provided. The indicator light (10) includes a body section (11), a cover section (12) detachably mounted on the body section (11), a printed circuit board (14) received in the body section (11) and a lamp (13) electrically connected to the printed circuit board (14). The lamp (13) faces the cover section (12) guiding lights from the lamp (13) to the body section (11).

9 Claims, 4 Drawing Sheets

INDICATOR LIGHT

BACKGROUND

1. Field of the Invention

The present invention relates to indicator lights and, particularly, to indicator lights powered by light emitting diodes (LEDS).

2. Description of Related Art

Electronic devices are often equipped with indicator lights for conveying different information to the user.

The indicator lights are usually powered by light emitting diodes. The indicator lights are electrically connected to the printed circuit body portions, and are exposed to user view through a hole defined in a cover of the electronic devices.

However, indicator lights may easily be damaged by this exposure from the electronic devices. Further, indicator lights often cannot change their colors according to need.

Therefore, there is room for improvement within the art.

BRIEF DESCRIPTION OF THE DRAWINGS

Many aspects of the indicator light can be better understood with reference to the following drawings. These drawings are not necessarily drawn to scale, the emphasis instead being placed upon clearly illustrating the principles of the present indicator light. Moreover, in the drawings like reference numerals designate corresponding sections throughout the several views.

DETAILED DESCRIPTION OF EXEMPLARY EMBODIMENTS

The present indicator light is suitable for portable electronic devices, such as mobile phone terminals, digital cameras, and etc.

Figure 1:
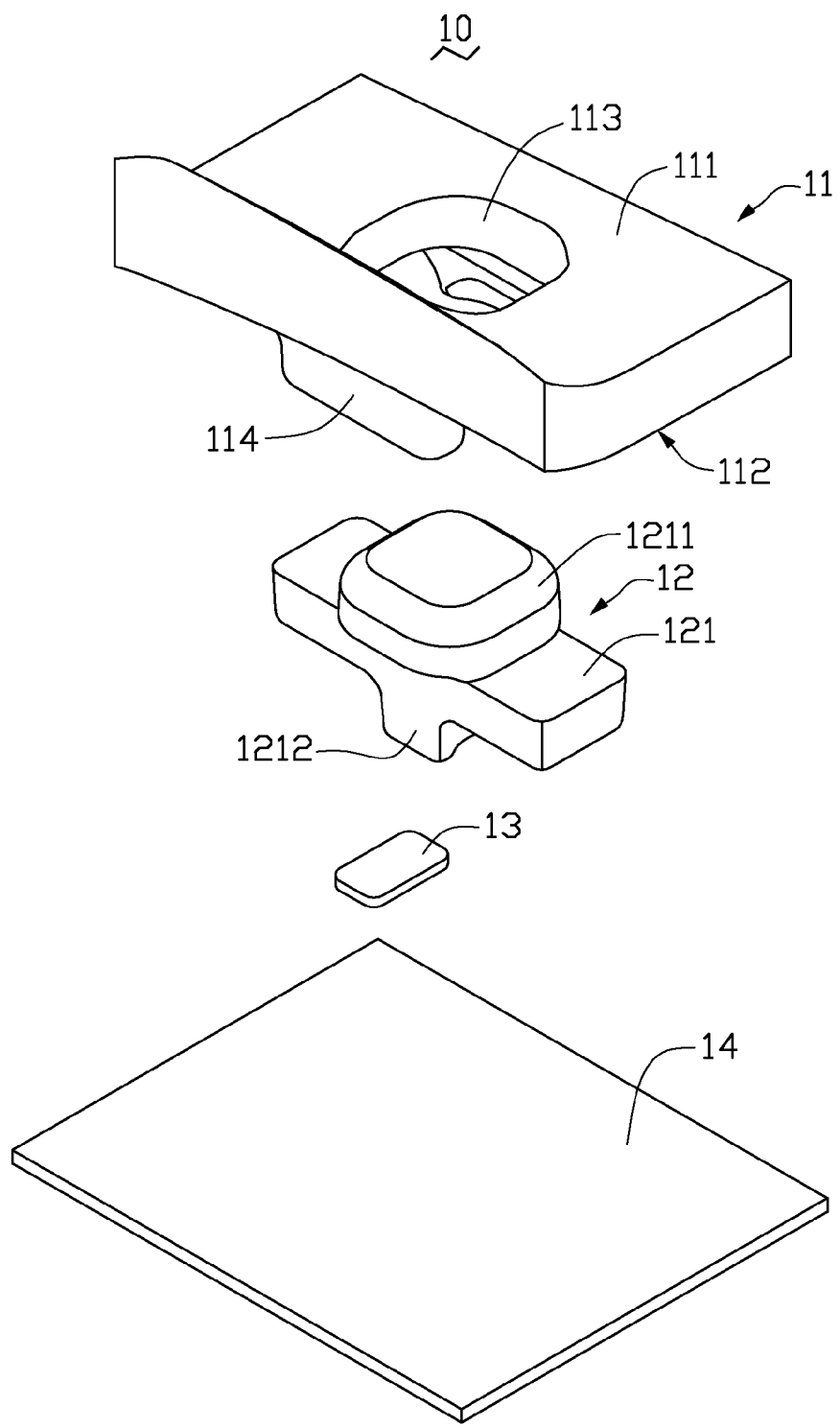
FIG. 1 is an exploded, isometric view of an indicator light, in accordance with an exemplary embodiment.
Figure 2:
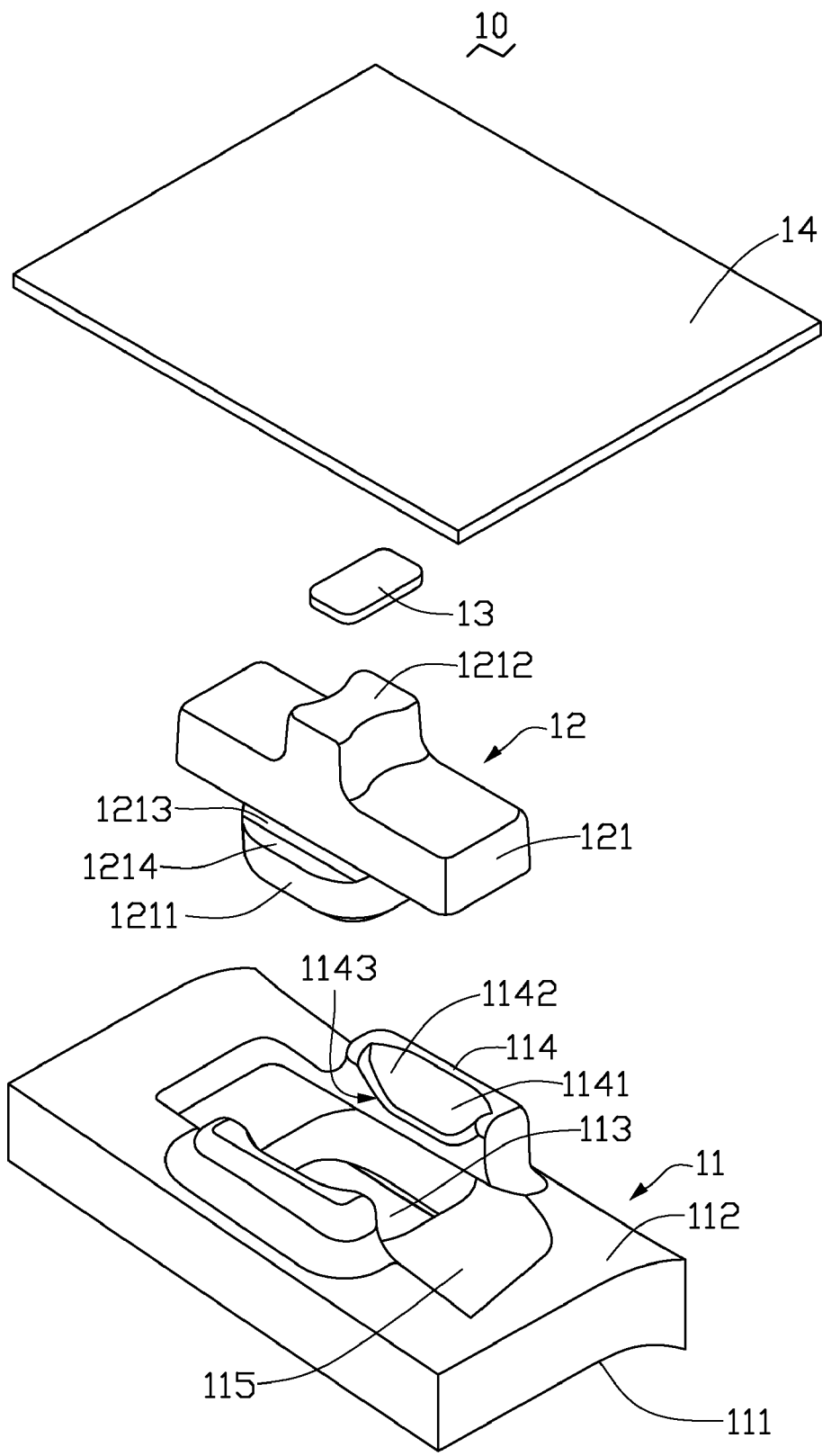
FIG. 2 is another exploded, isometric view of the indicator light shown in FIG. 1.

FIGS. 1 and 2 show two different views of an exemplary indicator light 10. The indicator light 10 may be used with a mobile phone to show its state of working. The indicator light 10 includes a body section 11, a cover section 12, a lamp 13 and a printed circuit board 14. The cover section 12 is mounted on the body section 11. The lamp 13 is located near the cover section 12. The lamp 13 is fixed to the printed circuit board 14.

The body section 11 is a part of, e.g., a mobile phone. The body section 11 has an outer surface 111 and an interior surface 112 opposite to the outer surface 111. The body section 11 defines a hole 113 there through. Two clasps 114 symmetrically protrude from the interior surface 112 on opposite sides of the hole 113. An end of each clasp 114 has a clasping portion 1141. The clasping portion 1141 has a guiding surface 1142 and a pressing surface 1143 facing the guiding surface 1142. The interior surface 112 also defines two symmetric slots 115 on opposite other sides of the hole 113.

The cover section 12 has a body portion 121. The body portion 121 includes a protruding head portion 1211. The head portion 1211 has the same shape and dimensions as the hole 113. The head portion 1211 is configured to be received in the hole 113. The head portion 1211 defines two slits 1213, one slit on each of its two sides adjacent to the body portion 121, and forming a stopping surface 1214. The slits 1213 correspond to the clasping portion 1141. A tail portion 1212 protrudes from the body portion 121, facing the lamp 13 and configured to transmit light to the head portion 1211. The cover section 12 is made of transparent and light-guiding material, such as polypropylene and etc.

The lamp 13 is an LED, which irradiates white or other colors of light. The lamp 13 is mounted on and electrically connected to the printed circuit board 14. The position of the lamp 13 corresponds to the position of the tail portion 1212. The printed circuit board 14 faces the interior surface 112 of the body section 11.

Figure 3:
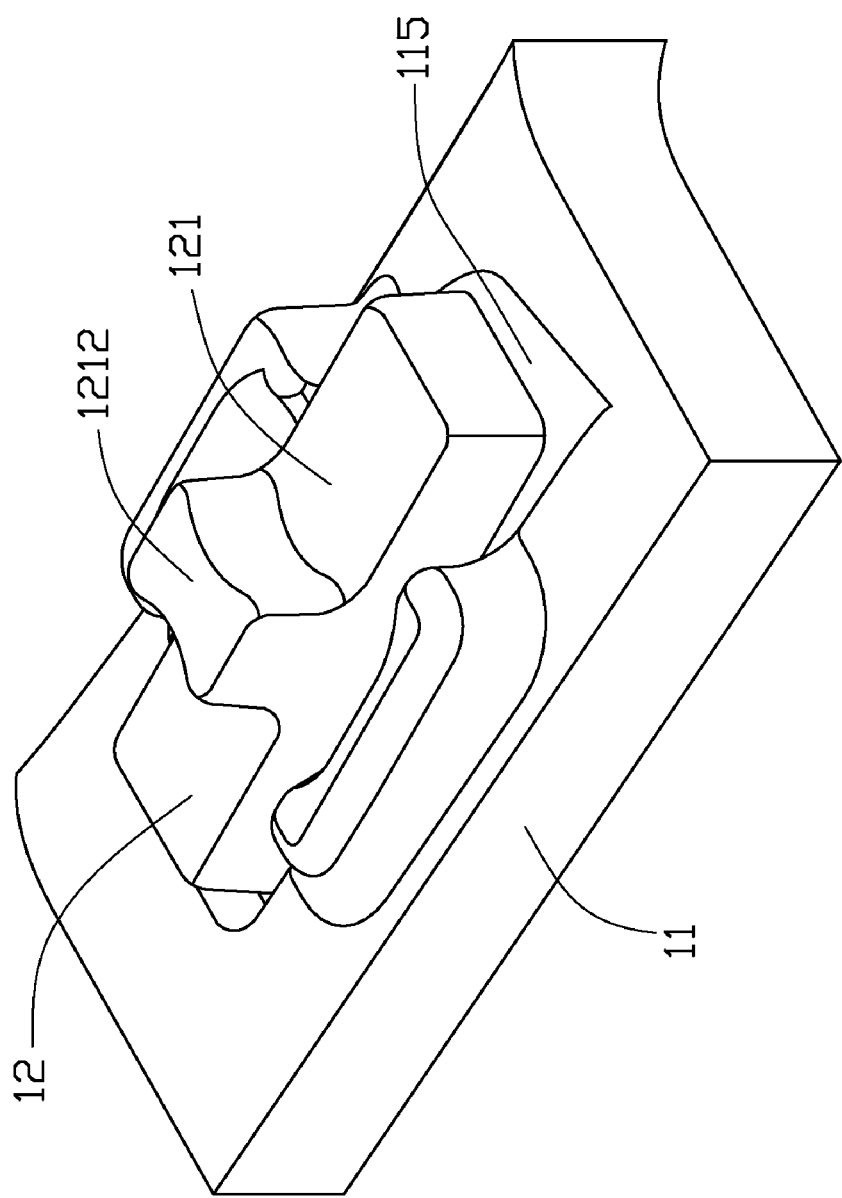
FIG. 3 is a partly isometric view of the indicator light shown in FIG. 1.
Figure 4:
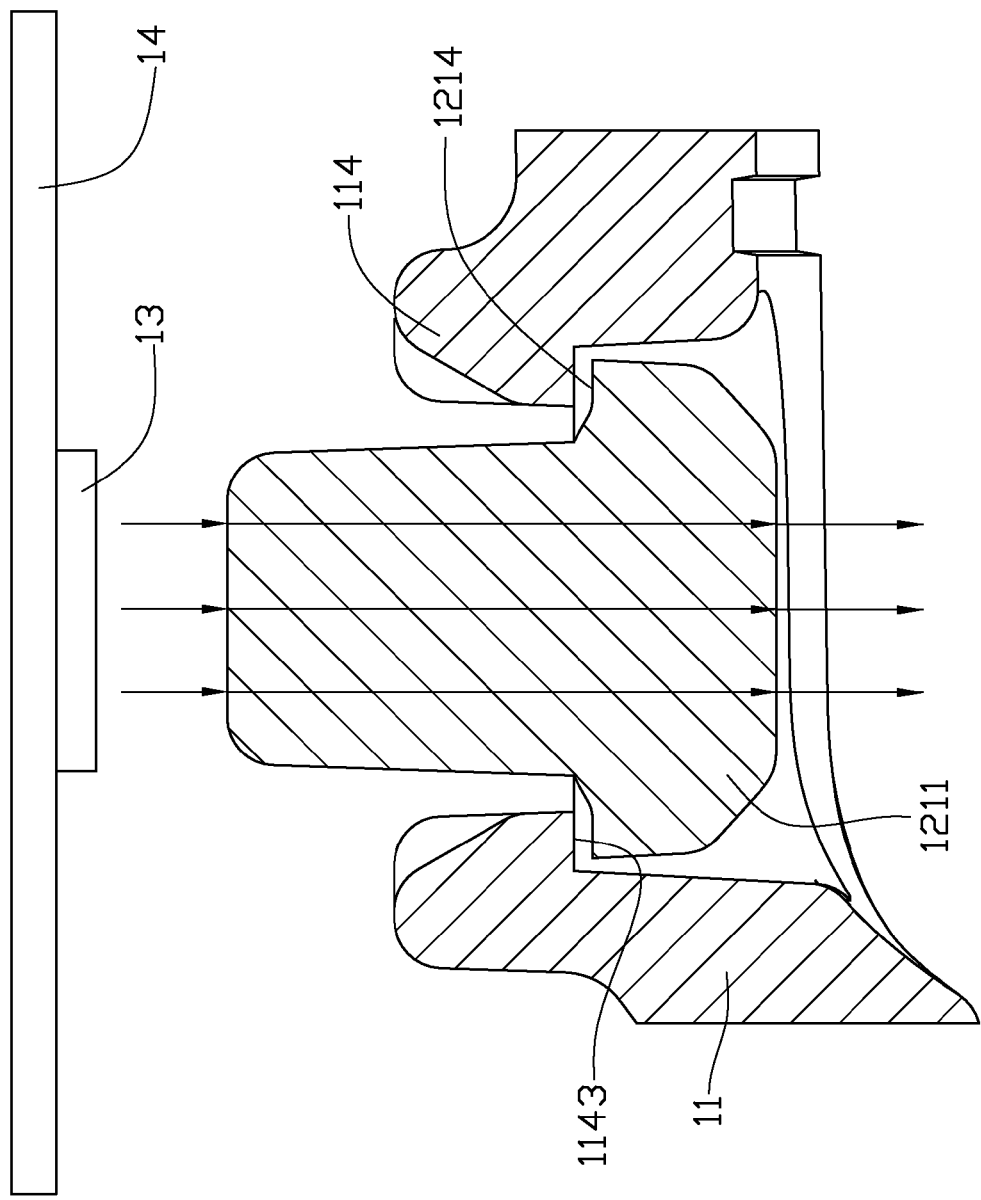
FIG. 4 is a sectional view of part of the indicator light shown in FIG. 3.

FIGS. 3 and 4 show the assembly of the indicator light 10, the head portion 1211 of the cover section 12 aligns with the hole 113 of the body section 11. The head portion 1211 slides along the guiding surface 1142 towards the hole 113 until the clasping portion 1141 clasps the slit 1213, at this time, the pressing surface 1143 presses against the stopping surface 1214, meanwhile, the body portion 121 is partly received in the slots 115. Finally the lamp 13 is mounted on and electrically connected to the printed circuit board 14 opposite to the tail portion 1212.

When replacing the cover section 12, the printed circuit board 14 with the lamp 13 are firstly removed, and then the two clasping portions 1141 are stretched to take out the cover section 12. One of the advantages of the present embodiment is that the cover section 12 can be swapped out for cover sections of different colors to guide different color lights to the outer surface 111 when needed, without damaging the lamp 13.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. An indicator light comprising: a body section defining a hole therethrough, clasps symmetrically protruding from opposite sides of the hole; a cover section detachably mounted to the body section, the cover section having a body portion, one side of the body portion including a protruding head portion, the head portion being received in the hole, opposite sides of the head portion defining symmetrical slits adjacent to the body portion and forming a stopping surface, the clasps for clasping the slits; a printed circuit body portion received in the body section; and a lamp electrically connected to the printed circuit body portion; wherein the lamp faces the cover section, so that the cover section guides lights from the lamp to the body section; wherein a body section defines a hole, the clasps symmetrically protrude from opposite sides of the hole, the cover section includes a head portion, symmetrical slits are defined at opposite sides of the head portion, the head portion is received in the hole, and the clasps clasp the slits; wherein the body section includes an interior surface defining two symmetrical slots on other opposite sides of the hole, the cover section includes a body portion being received in the slots.

2. The indicator light as claimed in claim 1, wherein the body section has an outer surface and an opposite interior surface, the printed circuit body portion adjacent to the interior surface.

3. The indicator light as claimed in claim 1, wherein the other side of the body portion includes a protruding tail portion, facing the lamp.

4. The indicator light as claimed in claim 1, wherein each clasp includes a clasping portion, the clasping portion has a guiding surface and a pressing surface opposite to the guiding surface, the pressing surface clasps the stopping surface.

5. The indicator light as claimed in claim 2, wherein the interior surface defines two symmetrical slots on other opposite sides of the hole, and the body portion is received in the slots.

6. The indicator light as claimed in claim 1, wherein the cover section is made of transparent and light-guiding material.

7. The indicator light as claimed in claim 1, wherein the lamp is an LED.

8. An indicator light, comprising: a body section being a part of a housing of an electronic device, the body section defining symmetrical clasps; a cover section detachably mounted to the body section, the cover section defining symmetrical slits, the clasps clasp the slits; a printed circuit body portion received in the body section; and a lamp electrically connected to the printed circuit body portion; wherein the lamp faces the cover section, so that the cover section guides lights from the lamp to the body section; wherein a body section defines a hole, the clasps symmetrically protrude from opposite sides of the hole, the cover section includes a head portion, symmetrical slits are defined at opposite sides of the head portion, the head portion is received in the hole, and the clasps clasp the slits; wherein the body section includes an interior surface defining two symmetrical slots on other opposite sides of the hole, the cover section includes a body portion being received in the slots.

9. The indicator light as claimed in claim 8, wherein each clasp includes a clasping portion, the clasping portion has a guiding surface and a pressing surface opposite to the guiding surface, each slit forms a stopping surface, and the pressing surface clasps the stopping surface.

* * * * *